US011718328B2

(12) United States Patent
Bieg

(10) Patent No.: US 11,718,328 B2
(45) Date of Patent: Aug. 8, 2023

(54) METHOD AND DEVICE FOR SUPPORTING AN ATTENTIVENESS AND/OR DRIVING READINESS OF A DRIVER DURING AN AUTOMATED DRIVING OPERATION OF A VEHICLE

(71) Applicant: Robert Bosch GmbH, Stuttgart (DE)

(72) Inventor: Hans-Joachim Bieg, Weil Im Schoenbuch (DE)

(73) Assignee: ROBERT BOSCH GMBH, Stuttgart (DE)

( * ) Notice: Subject to any disclaimer, the term of this patent is extended or adjusted under 35 U.S.C. 154(b) by 33 days.

(21) Appl. No.: 17/048,977

(22) PCT Filed: Jun. 5, 2019

(86) PCT No.: PCT/EP2019/064667
§ 371 (c)(1),
(2) Date: Oct. 19, 2020

(87) PCT Pub. No.: WO2020/020526
PCT Pub. Date: Jan. 30, 2020

(65) Prior Publication Data
US 2021/0237775 A1 Aug. 5, 2021

(30) Foreign Application Priority Data
Jul. 24, 2018 (DE) .......................... 102018212286.5

(51) Int. Cl.
*B60W 60/00* (2020.01)
*B60W 40/08* (2012.01)
(Continued)

(52) U.S. Cl.
CPC ........ *B60W 60/0053* (2020.02); *B60W 40/08* (2013.01); *B60W 50/0097* (2013.01);
(Continued)

(58) Field of Classification Search
CPC ............. B60W 60/0053; B60W 40/08; B60W 50/0097; B60W 50/0205; B60W 50/045;
(Continued)

(56) References Cited

U.S. PATENT DOCUMENTS 9,823,657 B1 * 11/2017 Palmer .............. B60W 60/0053
2015/0338222 A1 * 11/2015 Okada .................... G01C 21/30
701/409
(Continued)

FOREIGN PATENT DOCUMENTS

| DE | 102012112802 A1 | 6/2014 |
| EP | 3128498 A1 | 2/2017 |
| JP | 2017162406 A | 9/2017 |

OTHER PUBLICATIONS

International Search Report dated Aug. 20, 2019 for PCT/EP2019/064667.

*Primary Examiner* — Aniss Chad
*Assistant Examiner* — Stephanie T Su
(74) *Attorney, Agent, or Firm* — Norton Rose Fulbright US LLP; Gerard Messina

(57) ABSTRACT

A method for supporting an attentiveness and/or driving readiness of a driver during automated driving operation of a vehicle, including computing a failure probability value using at least one read-in map information signal, environmental condition signal, and/or probability signal. The failure probability value represents a failure probability of a driver assistance system for performing an automated driving operation. The probability signal represents an error probability and/or failure probability of at least one vehicle sensor of the driver assistance system. The method also includes determining a comparison parameter in response to the computed failure probability value, the comparison parameter representing the result of a comparison of an extent of a necessary driving requirement on the traveled
(Continued)

travel route of the vehicle to a degree of instantaneous driver attentiveness. The method also includes providing an advance warning signal in response to the determined comparison parameter.

10 Claims, 2 Drawing Sheets

(51) Int. Cl.
  *B60W 50/00* (2006.01)
  *B60W 50/02* (2012.01)
  *B60W 50/04* (2006.01)
  *B60W 50/14* (2020.01)
  *B60W 50/16* (2020.01)

(52) U.S. Cl.
  CPC ...... *B60W 50/0205* (2013.01); *B60W 50/045* (2013.01); *B60W 50/16* (2013.01); *B60W 2040/0872* (2013.01); *B60W 2050/046* (2013.01); *B60W 2050/143* (2013.01); *B60W 2050/146* (2013.01); *B60W 2540/223* (2020.02); *B60W 2540/30* (2013.01); *B60W 2555/20* (2020.02); *B60W 2756/10* (2020.02)

(58) Field of Classification Search
  CPC ............. B60W 50/16; B60W 2756/10; B60W 2555/20; B60W 2540/223; B60W 2040/0872; B60W 2050/046; B60W 2050/143; B60W 2050/146; B60W 2540/30
  See application file for complete search history.

(56) References Cited

U.S. PATENT DOCUMENTS

| | | | |
|---|---|---|---|
| 2016/0068103 A1* | 3/2016 | McNew | B60W 50/14 701/23 |
| 2016/0146618 A1* | 5/2016 | Caveney | B60W 50/14 701/25 |
| 2017/0261982 A1 | 9/2017 | Otaki et al. | |
| 2017/0309092 A1* | 10/2017 | Rosenbaum | G01M 17/007 |
| 2019/0215399 A1* | 7/2019 | Simon | B60W 30/00 |
| 2020/0039535 A1* | 2/2020 | Marberger | B60W 30/12 |

* cited by examiner

METHOD AND DEVICE FOR SUPPORTING AN ATTENTIVENESS AND/OR DRIVING READINESS OF A DRIVER DURING AN AUTOMATED DRIVING OPERATION OF A VEHICLE

FIELD

The present invention is directed to a device and a method for supporting an attentiveness and/or driving readiness of a driver during an automated driving operation of a vehicle. The present invention further relates to a computer program.

BACKGROUND INFORMATION

Automatedly driving vehicles may at least partially relieve the driver of his/her driving task. During the automated travel of the vehicle, this provides an opportunity to carry out secondary tasks. However, during automated driving, situations may still occur in which the likelihood of a driving error, for example due to construction markers, or a complete failure of the automation, for example due to heavy rain and/or snow, is particularly higher. For safely driving through such situations, the driver may be required by the system to take over the driving task.

SUMMARY

The present invention provides a method for supporting an attentiveness and/or driving readiness of a driver during an automated driving operation of a vehicle, in addition to a device that uses this method, as well as a corresponding computer program. Advantageous refinements and enhancements of the methods and devices described herein are possible via the measures set forth herein.

In accordance with an example embodiment of the present invention, with respect to an error probability and/or failure probability of at least one vehicle sensor for carrying out an automated driving operation of a vehicle, a driver of the vehicle is supported in devoting the necessary attention to the driving task and showing driving readiness. The present invention thus allows a smooth transition between an occupation of the driver with a secondary task and a complete takeover of the driving task. Interfering interruptions of the secondary task are thus mitigated. This results in increased driving satisfaction, and at the same time safer travel of the vehicle.

In accordance with the present invention, a method for supporting an attentiveness and/or driving readiness of a driver during an automated driving operation of a vehicle is provided. In accordance with an example embodiment, the method includes the following steps:

Computing a failure probability value using at least one read-in map information signal, environmental condition signal, and/or probability signal, the failure probability value representing a failure probability of a driver assistance system for carrying out an automated driving operation, the map information signal representing a road topography and/or confidence topography on a travel route that is traveled by the vehicle, the environmental condition signal representing a weather condition in the surroundings of the vehicle, and the probability signal representing an error probability and/or failure probability of at least one vehicle sensor of the driver assistance system;

Determining a comparison parameter in response to the computed failure probability value, the comparison parameter representing the result of a comparison of an extent of a necessary driving requirement on the traveled travel route of the vehicle to a degree of instantaneous attentiveness of the driver; and Providing an advance warning signal in response to the determined comparison parameter, the advance warning signal representing an advance warning for actively taking over a vehicle guidance by the driver of the vehicle.

A vehicle may be a vehicle for passenger transportation, for example a highly automatedly driving vehicle. A vehicle may also be understood to mean a commercial vehicle for transporting persons and/or goods, for example a highly automatedly driving truck or bus. A vehicle driver may be any person who directly steers or controls a vehicle. In addition, a person who guides a vehicle in some other responsible manner, i.e., indirectly, may also be regarded as a vehicle driver. An automated driving operation may be understood to mean a driving mode-specific execution of all aspects of the dynamic driving task by an automated driving system. For example, it may be expected that the human driver of a vehicle will appropriately respond when requested by the system in order to take over a driving task under adverse weather conditions, for example. Automated driving operations may be associated with vehicles that behave similarly to aircraft in autopilot mode, i.e., that carry out steering, blinking, acceleration, and braking maneuvers longitudinally and transversely with respect to the lane without human intervention. The vehicle initially obtains its input data from visual information sources that are also available to the driver. In preliminary stages of automated driving operations, human perception may be supported by providing information that allows reliable decision-making and a rapid response by the driver. However, if the response by the vehicle takes place automatically via algorithms and vehicle responses linked thereto, without the active influence of the driver, this may be referred to as an automated driving operation. The system itself may recognize its own limits, and in this case may request takeover by the driver at the right time. Consequently, options for non-driving activities by the driver are thus possible to a limited extent.

In computing the failure probability of the automated driving operation of the vehicle, the map information signal may represent in particular a road topography and/or confidence topography on a travel route that is traveled by the vehicle. The road topography may represent, for example, a reduced forecast from a video and radar sensor system of the vehicle at corresponding curve radii and/or inclinations of the traveled travel route. In addition, the road topography may represent a reduced forecast and/or a view of the video and radar sensor system of the vehicle when there is blocking by terrain structures and/or buildings next to the roadway. In contrast, the confidence topography may represent the failure events depicted in a map, and failure probabilities ascertained therefrom which have been reported back to the manufacturer during travel by vehicles that include a comparable sensor system.

In computing the failure probability of the automated driving operation of the vehicle, the environmental condition signal may represent in particular a weather condition in the surroundings of the vehicle. This may be a weather condition, for example a known impairment of a vehicle sensor system due to weather phenomena such as rain, snow, and/or storms.

In computing the failure probability of the automated driving operation of the vehicle, the probability signal may represent in particular an error probability and/or failure probability of at least one vehicle sensor of the driver assistance system. Thus, the probability signal may represent, for example, a probability of imminent sensor failure, for example a self-test installed in the sensor and/or a failure of redundant sensors. In addition, the probability signal may represent, for example, a perception-based failure probability, for example an extended, multiple, or implausible failure and/or error in the sensing of control-relevant features, for example of a lane, a curb, and/or a preceding vehicle, by a sensor.

The advantages of the approach presented here for supporting an attentiveness and/or driving readiness of a driver during an automated driving operation of a vehicle may be, in particular, that a failure probability of a driver assistance system for carrying out the automated driving operation may be computed. Thus, in the description below, by use of the computed failure probability a driver of the vehicle may be provided with an appropriate instruction concerning required attentiveness for monitoring the driving function and for preparing to possibly take over the driving task. In addition, with the aid of the approach presented here, attentiveness and/or a driving behavior of the driver with regard to the provided attentiveness instruction may be monitored, and steps may accordingly be initiated to increase traffic safety. Thus, by use of the approach presented here, it is advantageously possible to boost a lack of acceptance for "incapacitating" driving assistance systems for potential purchasers of such vehicles.

According to one specific embodiment of the present invention, in the step of determining the comparison parameter, the extent of a necessary driving requirement on the traveled travel route of the vehicle may be determined using the map information signal and/or the environmental condition signal, in particular a necessary driving requirement representing a driving maneuver to be carried out during an assumed takeover of the driving task by the driver. The map information signal represents, for example, a road topography and/or confidence topography on a travel route that is traveled by the vehicle. Thus, with the aid of the road topography a piece of information concerning a reduced forecast of a video and/or radar sensor system of the vehicle at corresponding curve radii and/or uphill grades on the travel route that is traveled by the vehicle may be ascertained. In addition, with the aid of the road topography, for example a piece of information concerning a reduced forecast and/or a view of a video and/or radar sensor system of the vehicle, for example also when there is blocking by buildings and/or other concealing objects or structures next to the roadway. The confidence topography may, for example, indicate the failure events depicted in a map and a failure probability of vehicle sensors ascertained therefrom which have been reported back to the manufacturer during travel by vehicles that include a comparable sensor system. Such a specific embodiment of the present invention may, thus, offer the advantage that it may be determined whether appropriate driving maneuvers by the driver are necessary to avoid hazards, for example when taking over the driving task during a curve. As a result, the vehicle may not only plan a transfer of the vehicle guidance to the driver, which may be carried out safely and without accidents, but may also recognize early and avoid a potentially critical traffic situation.

According to a further specific embodiment of the present invention, in the step of determining the comparison parameter, the degree of instantaneous attentiveness of the driver may be determined using an attentiveness signal of an interior sensor of the vehicle, the attentiveness signal representing an instantaneous viewing direction of the driver and/or a head position of the driver and/or a sitting position of the driver and/or a hand position of the driver. In the approach presented here, for example using a tracking system such as a video-based eye tracker, a measurement of the instantaneous viewing direction and/or a viewing angle as well as a head position and/or head orientation of the driver may take place. In addition, monitoring of the body position of the driver, in particular the driver's hand configuration and hand position, may take place with the aid of a video or 3D sensor system. Such a specific embodiment of the approach presented here thus offers the advantage that an instantaneous degree of the driver's attentiveness and/or fitness to drive may be determined with the aid of a vehicle interior sensor, so that the vehicle may warn the driver in real time and in an all-encompassing manner that a possible transfer of the driving task to the driver is imminent.

Furthermore, the method may include a step of checking, in which according to one specific embodiment a driving behavior of the driver in response to the provided advance warning signal is checked using the attentiveness signal, the automated driving operation being switched off and/or a controlled transfer of the driving task to the driver being prompted if the driver ignores the advance warning for actively taking over a vehicle guidance. Such a specific embodiment of the approach presented here offers the advantage that, using the advance warning signal, a request to the driver takes place to keep an eye on the roadway and/or grip the steering wheel, a controlled transfer of the driving task to the driver as well as switching off the automated driving operation taking place if the driver fails to comply with the request. The vehicle may thus, for example, plan a safe, accident-free, and comfortable transfer of the vehicle guidance to the driver, and may also recognize early and avoid a potentially critical traffic situation.

According to one specific embodiment of the present invention, in the step of checking, the automated driving operation may be switched off and/or a controlled transfer of the driving task to the driver may be prompted after expiration of a predetermined time window, in particular the time window being at most 3 seconds, for example. If critical situations, such as a sensor failure and/or inclement weather conditions, possibly occur that are not solvable by the driving assistance system itself, the driver should be able to comfortably take over the driving task at the right time. This may be based on the assumption that when traveling in highly automated states, a driver is occupied with secondary tasks that should be considered in the design of a transfer operation. The time that is then necessary for a transfer may vary, depending on a driving situation to be handled and an instantaneous driver state. The necessary transfer time may, for example, be a function, among other things, of how much time the driver needs to obtain a complete view of his/her surroundings, to obtain appropriate awareness of the situation, and to take over control of the vehicle from the system. In particular the complexity of the driving situation may play a role. Such a specific embodiment of the approach presented here thus offers the advantage that a takeover time is always sought in which the driving task may be successfully taken over, and in addition the takeover is perceived as comfortable without resulting in impairment of general traffic safety.

In addition, according to one specific embodiment of the present invention, in the step of determining, the comparison parameter may be determined when the computed failure probability value of a driver assistance system for carrying out an automated driving operation is at least 50 percent, in particular in the step of providing, the advance warning signal being provided when the determined comparison parameter represents a discrepancy between the extent of a necessary driving requirement on the traveled travel route of the vehicle and the degree of instantaneous attentiveness of the driver. Such a specific embodiment of the approach presented here thus offers the advantage in particular that a potentially critical traffic situation may be recognized earlier and avoided, thus increasing general traffic safety.

According to one specific embodiment of the present invention, the advance warning signal may be acoustically, visually, and/or haptically output in the step of providing. An acoustic advance warning of the driver may thus take place, for example, using a speaker system that is installed in the vehicle; the acoustic advance warning should be characterized in particular by a high pitch and volume. A visual advance warning of the driver may take place, for example, via a display device of the vehicle, for example an onboard computer and/or a head-up display. It is thus also conceivable that a visual advance warning may take place, likewise using a light emission in the vehicle interior, for example a color of light changing and/or the light blinking, which would be advantageous in particular when the vehicle is traveling at night. A haptic advance warning of the driver may take place, for example, with the aid of a vibrating seating device on which the driver of the vehicle sits or rests. Such a specific embodiment of the approach presented here thus offers the advantage that a driver of the vehicle, corresponding to his/her state, may be optimally warned in advance that a possible transfer of the vehicle guidance is imminent.

Furthermore, according to one specific embodiment of the present invention, in the step of providing, a warning signal may be provided to a vehicle-external processing unit, and/or to other vehicles situated in the surroundings of the vehicle via a vehicle-to-vehicle communication interface, the warning signal representing a warning of a failure probability of a driver assistance system for carrying out an automated driving operation and/or of switching off an automated driving operation of the vehicle. Such a specific embodiment of the approach presented here offers the advantage that a warning or a piece of information concerning a failure of a driver assistance system of a vehicle and/or concerning a transfer of a driving task to a driver of the vehicle may be shared quickly, easily, and effectively, so that the vehicles situated in the surroundings of the vehicle may prepare for driving slowly and anticipatorily and pay attention to the stated vehicle if a transfer of the driving task to the driver turns out to be difficult, contrary to expectations. Traffic safety may be increased in this way.

According to one specific embodiment of the present invention, the step of computing and/or the step of determining and/or the step of providing may be carried out on a vehicle-external processing unit and/or on a processing unit that is installed in the vehicle, in particular the step of computing and/or the step of determining being carried out repeatedly. Such a specific embodiment of the approach presented here on a vehicle-external processing unit thus offers the advantage that processing data in a vehicle-external processing unit means lower computing requirements in the vehicle itself, and allows associated lower energy consumption or the option to utilize resources for other functions. In addition, the external processing unit has greater available computing power than a vehicle-internal computer.

The example method in accordance with the present invention for supporting an attentiveness and/or driving readiness of a driver during an automated driving operation of a vehicle may be implemented, for example, in software or hardware or in a mixed form of software and hardware, for example in a control unit.

The present invention also provides a device that is designed to carry out, control, or implement the steps of one variant of a method provided here in appropriate units for supporting an attentiveness and/or driving readiness of a driver during an automated driving operation of a vehicle. In addition, the object underlying the present invention may also be quickly and efficiently achieved via this embodiment variant of the present invention in the form of a device.

For this purpose, in accordance with an example emebodiment of the present invention, the device may include at least one processing unit for processing signals or data, at least one memory unit for storing signals or data, at least one interface to a sensor or to an actuator for reading in sensor signals from the sensor or for outputting data signals or control signals to the actuator, and/or at least one communication interface for reading in or outputting data that are embedded in a communication protocol. The processing unit may be, for example, a signal processor, a microcontroller, or the like, and the memory unit may be a flash memory, an EEPROM, or a magnetic memory unit. The communication interface may be designed for reading in or outputting data wirelessly and/or in a hard-wired manner; a communication interface which may read in or output the line-bound data may read in these data electrically or optically, for example, from an appropriate data transmission line, or output same to an appropriate data transmission line.

In the present context, a device may be understood to mean an electrical device that processes sensor signals and outputs control and/or data signals as a function thereof. The device may include an interface which may have a hardware and/or software design. In a hardware design, the interfaces may be part of a so-called system ASIC, for example, which contains various functions of the device. However, it is also possible for the interfaces to be dedicated, integrated circuits, or to be at least partially made up of discrete components. In a software design, the interfaces may be software modules that are present on a microcontroller, for example, in addition to other software modules.

Also advantageous in accordance with the present invention is a computer program product or computer program including program code which may be stored on a machine-readable medium or memory medium such as a semiconductor memory, a hard disk, or an optical memory, and used for carrying out, implementing, and/or controlling the steps of the method according to one of the specific embodiments described above, in particular when the program product or program is executed on a computer or a device.

Exemplary embodiments of the present invention are illustrated in the figures and explained in greater detail below.

DETAILED DESCRIPTION OF EXAMPLE EMBODIMENTS

Figure 1:
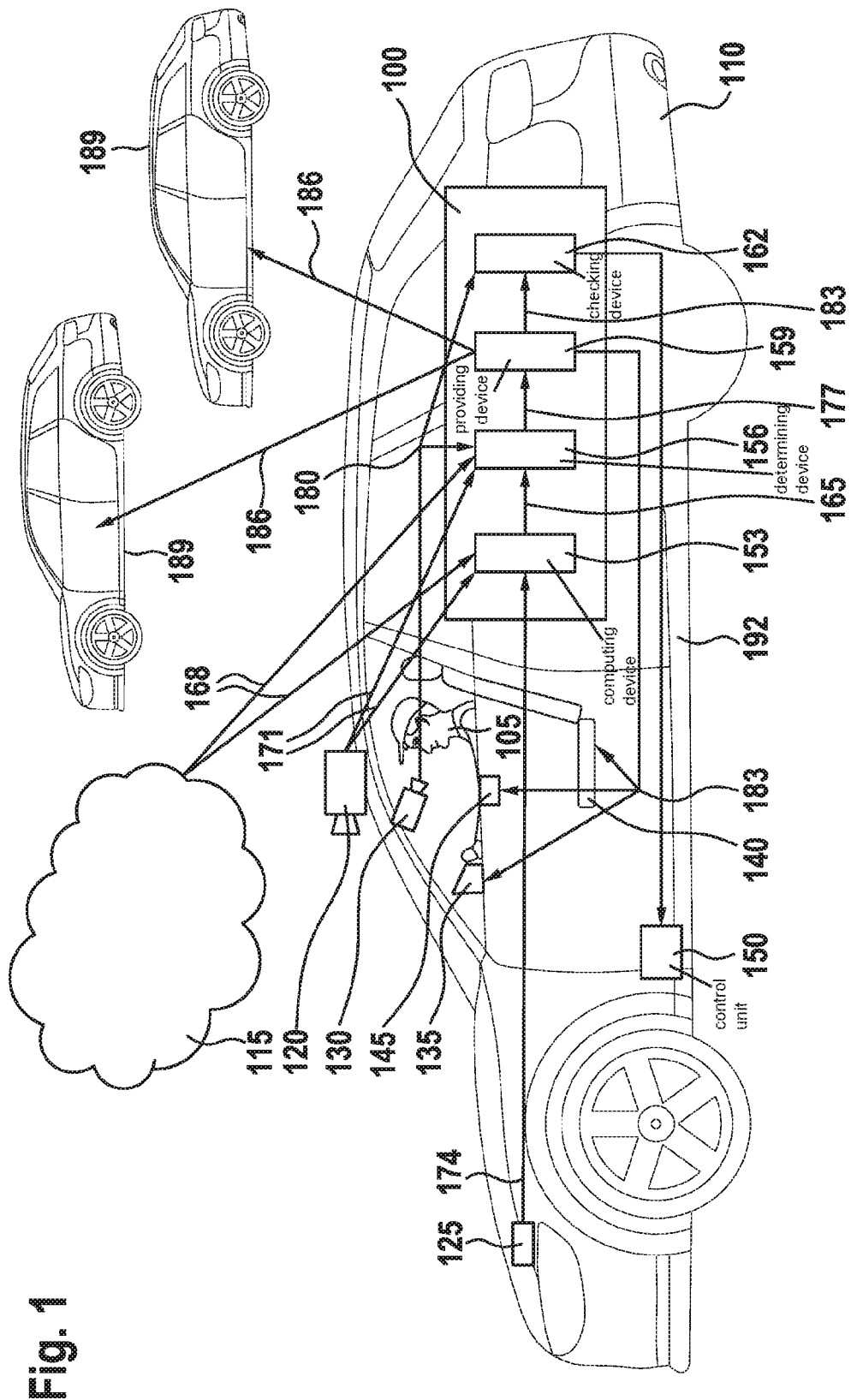
FIG. 1 shows a block diagram of a device for supporting an attentiveness and/or driving readiness of a driver during an automated driving operation of a vehicle, according to one exemplary embodiment of the present invention.

In the description below of advantageous exemplary embodiments of the present invention, identical or similar reference numerals are used for the elements having a similar action which are illustrated in the various figures, and a repeated description of these elements is dispensed with.

FIG. 1 shows a block diagram of a device 100 for supporting an attentiveness and/or driving readiness of a driver 105 during an automated driving operation of a vehicle 110 according to one exemplary embodiment of the present invention. Device 100 is situated on vehicle 110 by way of example. Additionally or alternatively, device 100 may be situated on a vehicle-external processing unit 115, for example of a cloud. According to one exemplary embodiment, vehicle 110 includes a camera unit 120 for optically detecting by sensor the surroundings of vehicle 110, at least one surroundings sensor 125 for detecting by sensor the surroundings of vehicle 110, a monitoring sensor 130, for example a monitoring camera unit 130, for monitoring a vehicle interior, a display unit 135 for visually displaying information, a seating device 140 for seating driver 105 in vehicle 110, a speaker device 145 for outputting acoustic information, and a control unit 150 for transversely and longitudinally guiding vehicle 110.

According to one exemplary embodiment of the present invention, device 100 includes a computing device 153, a determining device 156, a providing device 159, and a checking device 162. According to one exemplary embodiment of the present invention, computing device 153 is designed to compute a failure probability value 165 using at least one read-in map information signal 168, environmental condition signal 171, and/or probability signal 174, the failure probability value 165 representing a failure probability of a driver assistance system for carrying out an automated driving operation of vehicle 110. Map information signal 168, which represents a road topography and/or confidence topography on a travel route that is traveled by vehicle 110, by way of example is provided to computing device 153 by external processing unit 115. Additionally or alternatively, however, map information signal 168 may be provided to computing device 153 by a map, stored on a vehicle-internal memory. Environmental condition signal 171, which represents a weather condition in the surroundings of vehicle 110, by way of example is provided to computing device 153 by camera unit 120 of vehicle 110. Additionally or alternatively, environmental condition signal 171 may likewise be provided to computing device 153 by vehicle-external processing unit 115 and/or the at least one surroundings sensor 125 of vehicle 110. Probability signal 174, which represents an error probability and/or failure probability of at least one vehicle sensor of the driver assistance system, by way of example is provided to computing device 153 by surroundings sensor 125 of vehicle 110. Additionally or alternatively, probability signal 174 may likewise be provided to computing device 153 by control unit 150 of vehicle 110.

According to one exemplary embodiment of the present invention, determining device 156 is designed to determine a comparison parameter 177 in response to failure probability value 165 computed by computing device 153, comparison parameter 177 representing the result of a comparison of an extent of a necessary driving requirement on the traveled travel route of vehicle 110 to a degree of instantaneous attentiveness of driver 105. Determining device 156 is designed to determine the extent of a necessary driving requirement on the traveled travel route of vehicle 110 for determining comparison parameter 177, using map information signal 168 provided by vehicle-external processing unit 115 and/or environmental condition signal 171 provided by camera unit 120 of vehicle 110. Determining device 156 is also designed to determine the degree of instantaneous attentiveness of driver 105 for determining comparison parameter 177, using an attentiveness signal 180 that is provided by monitoring camera unit 130 of the vehicle interior, attentiveness signal 180 representing an instantaneous viewing direction of driver 105 and/or a head position of driver 105 and/or a sitting position of driver 105 and/or a hand position of driver 105.

According to one exemplary embodiment of the present invention, providing device 159 is designed to provide an advance warning signal 183 in response to previously determined comparison parameter 177, advance warning signal 183 representing an advance warning for active takeover of a vehicle guidance by driver 105 of vehicle 110. Advance warning signal 183 is acoustically, visually, and/or haptically output, an acoustic output taking place, for example, at speaker device 145 of vehicle 110, the visual output taking place, for example, at display device 135 of vehicle 110, and the haptic output taking place, for example, at seating device 140 of vehicle 110. According to one exemplary embodiment, providing device 159 is also designed to provide a warning signal 186, via a vehicle-to-vehicle communication interface, to other vehicles 189 that are situated in the surroundings of vehicle 110. Additionally or alternatively, warning signal 186 may likewise be provided to vehicle-external processing unit 115. Warning signal 186 represents a warning concerning a failure probability of a driver assistance system for carrying out an automated driving operation and/or a switching off of an automated driving operation of vehicle 110.

According to one exemplary embodiment of the present invention, checking device 162 is designed to check a driving behavior of driver 105 in response to provided advance warning signal 183, using attentiveness signal 180, the automated driving operation being switched off and/or a controlled transfer of the driving task to driver 105 of vehicle 110 being prompted if driver 105 ignores the advance warning for actively taking over a vehicle guidance. The checking device is also designed, for example, to provide a switch-off signal 192 to control unit 150 of vehicle 110, the automated driving operation being switched off and/or a controlled transfer of the driving task to driver 105 being prompted, using switch-off signal 192, after expiration of a predetermined time window, the time window being at most 3 seconds, for example.

Figure 2:
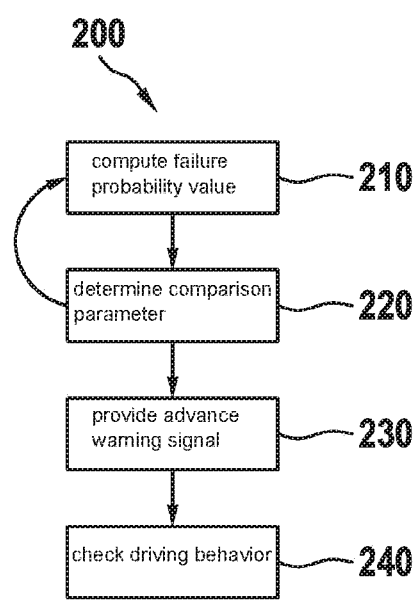
FIG. 2 shows a flowchart of one exemplary embodiment of a method for supporting an attentiveness and/or driving readiness of a driver during an automated driving operation of a vehicle, according to one exemplary embodiment of the present invention.

FIG. 2 shows a flowchart of one exemplary embodiment of a method 200 for supporting an attentiveness and/or driving readiness of a driver during an automated driving operation of a vehicle according to one exemplary embodiment of the present invention. By way of example, method 200 may be carried out on the device for supporting an attentiveness and/or driving readiness of a driver during an automated driving operation of a vehicle from FIG. 1.

Method 200 includes an initial step 210, in which a failure probability value is computed using at least one read-in map information signal, environmental condition signal, and/or probability signal. The failure probability value represents a failure probability of a driver assistance system for carrying out an automated driving operation, the map information signal representing a road topography and/or confidence topography on a travel route that is traveled by the vehicle, the environmental condition signal representing a weather condition in the surroundings of the vehicle, and the probability signal representing an error probability and/or failure probability of at least one vehicle sensor of the driver assistance system. Method 200 includes a subsequent step 220 in which a comparison parameter is determined in response to the computed failure probability value, the comparison parameter representing the result of a comparison of an extent of a necessary driving requirement on the traveled travel route of the vehicle to a degree of instantaneous attentiveness of the driver. Method 200 includes a further step 230 in which an advance warning signal is provided in response to the determined comparison parameter, the advance warning signal representing an advance warning for active takeover of a vehicle guidance by the driver of the vehicle. Lastly, method 200 includes a step 240 in which a driving behavior of the driver in response to the provided advance warning signal is checked, using the attentiveness signal, the automated driving operation being switched off and/or a controlled transfer of the driving task to the driver being prompted if the driver ignores the advance warning for actively taking over a vehicle guidance.

According to one specific embodiment of the present invention, step 210 and/or step 220 are/is carried out repeatedly.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for supporting at least one of an attentiveness or a driving readiness of a driver during an automated driving operation of a vehicle, the method comprising:
   computing a failure probability value using a probability signal and a read-in map information signal and an environmental condition signal, the failure probability value representing a failure probability of a driver assistance system for carrying out an automated driving operation, the map information signal representing a road topography or confidence topography on a travel route that is traveled by the vehicle, and the environmental condition signal representing a weather condition in surroundings of the vehicle, wherein the probability signal represents an error probability or failure probability of at least one vehicle sensor of the driver assistance system;
   determining a comparison parameter in response to the computed failure probability value, the comparison parameter representing a result of a comparison of an extent of a driving requirement on the traveled travel route of the vehicle to a degree of an instantaneous attentiveness of the driver;
   providing an advance warning signal in response to the determined comparison parameter, the advance warning signal representing an advance warning for actively taking over a vehicle guidance by the driver of the vehicle; and
   checking a driving behavior of the driver in response to the provided advance warning signal, using an attentiveness signal, at least one of the automated driving operation being switched off or a controlled transfer of the driving task to the driver being prompted when the driver ignores the advance warning for actively taking over a vehicle guidance.

2. The method as recited in claim 1, wherein in the determining the comparison parameter, the extent of a driving requirement on the traveled travel route of the vehicle is determined using at least one of the map information signal or the environmental condition signal, the driving requirement representing a driving maneuver to be carried out.

3. The method as recited in claim 1, wherein in the determining the comparison parameter, the degree of instantaneous attentiveness of the driver is determined using the attentiveness signal of an interior sensor of the vehicle, the attentiveness signal representing at least one of an instantaneous viewing direction of the driver, or a head position of the driver, or a sitting position of the driver, or a hand position of the driver.

4. The method as recited in claim 3, wherein in the checking, at least one of the automated driving operation is switched off or a controlled transfer of the driving task to the driver is prompted after expiration of a predetermined time window, the time window being at most 3 seconds.

5. The method as recited in claim 1, wherein in the determining, the comparison parameter is determined when the computed failure probability value of a driver assistance system for carrying out an automated driving operation is at least 50 percent, and in the providing, the advance warning signal being provided when the determined comparison parameter represents a discrepancy between the extent of a driving requirement on the traveled travel route of the vehicle and the degree of instantaneous attentiveness of the driver.

6. The method as recited in claim 1, wherein in the providing, the advance warning signal is output at least one of acoustically or visually or haptically.

7. The method as recited in claim 1, wherein in the providing, a warning signal is provided to at least one of a vehicle-external processing unit, or other vehicles situated in the surroundings of the vehicle via a vehicle-to-vehicle communication interface, the warning signal representing a warning of a failure probability of a driver assistance system for at least one of carrying out an automated driving operation or a switching off of an automated driving operation of the vehicle.

8. The method as recited in claim 1, wherein the at least one of the computing or the determining or the providing is carried out on a vehicle-external processing unit or on a processing unit that is installed in the vehicle, and wherein the computing or the determining is carried out repeatedly.

9. An apparatus for supporting at least one of an attentiveness or a driving readiness of a driver during an automated driving operation of a vehicle, comprising:
   a device configured to perform the following:
      computing a failure probability value using a probability signal and a read-in map information signal, and an environmental condition signal, the failure probability value representing a failure probability of a driver assistance system for carrying out an automated driving operation, the map information signal representing at least one of a road topography or a confidence topography on a travel route that is traveled by the vehicle, and the environmental condition signal representing a weather condition in surroundings of the vehicle, wherein the probability signal represents at least one of an error probability or a failure probability of at least one vehicle sensor of the driver assistance system;
      determining a comparison parameter in response to the computed failure probability value, the comparison parameter representing a result of a comparison of an extent of a driving requirement on the traveled travel route of the vehicle to a degree of an instantaneous attentiveness of the driver;

providing an advance warning signal in response to the determined comparison parameter, the advance warning signal representing an advance warning for actively taking over a vehicle guidance by the driver of the vehicle; and checking a driving behavior of the driver in response to the provided advance warning signal, using an attentiveness signal, at least one of the automated driving operation being switched off or a controlled transfer of the driving task to the driver being prompted when the driver ignores the advance warning for actively taking over a vehicle guidance.

10. A non-transitory machine-readable memory medium, on which is stored a computer program, which is executable by a processor, comprising:

a program code arrangement having program code for supporting at least one of an attentiveness or a driving readiness of a driver during an automated driving operation of a vehicle, by performing the following:

computing a failure probability value using a probability signal and a read-in map information signal, and an environmental condition signal, the failure probability value representing a failure probability of a driver assistance system for carrying out an automated driving operation, the map information signal representing at least one of a road topography or a confidence topography on a travel route that is traveled by the vehicle, and the environmental condition signal representing a weather condition in surroundings of the vehicle, wherein the probability signal represents at least one of an error probability or a failure probability of at least one vehicle sensor of the driver assistance system;

determining a comparison parameter in response to the computed failure probability value, the comparison parameter representing a result of a comparison of an extent of a driving requirement on the traveled travel route of the vehicle to a degree of an instantaneous attentiveness of the driver;

providing an advance warning signal in response to the determined comparison parameter, the advance warning signal representing an advance warning for actively taking over a vehicle guidance by the driver of the vehicle; and checking a driving behavior of the driver in response to the provided advance warning signal, using an attentiveness signal, at least one of the automated driving operation being switched off or a controlled transfer of the driving task to the driver being prompted when the driver ignores the advance warning for actively taking over a vehicle guidance.

\* \* \* \* \*